*Courtney & Kelagher.*

*Mouth-Piece for Smoking Pipes.*

N° 85,795. Patented Jan. 12, 1869.

Witnesses,
H. C. Aselkettle
Wm A. Morgan.

Inventors.
J. P. Courtney
H. H. Kelagher
per Munn & Co.
Attorneys.

United States Patent Office.

J. P. COURTNEY AND WILLIAM H. KELAGHER, OF BROOKLYN, NEW YORK, ASSIGNORS TO J. P. COURTNEY

*Letters Patent No. 85,795, dated January 12, 1869.*

IMPROVEMENT IN MOUTH-PIECES FOR SMOKING-PIPES.

The Schedule referred to in these Letters Patent and making part of the same.

*To all whom it may concern:*

Be it known that we, J. P. COURTNEY and WILLIAM H. KELAGHER, of Brooklyn, in the county of Kings, and State of New York, have invented a new and improved Smoking-Pipe Mouth-Piece Attachment; and we do hereby declare that the following is a full, clear, and exact description thereof, which will enable those skilled in the art to make and use the same, reference being had to the accompanying drawings, forming part of this specification.

This invention relates to improvements in smoking-pipes, whereby the saliva, or liquid from the mouth of the smoker, is prevented from entering the stem or tube of the pipe; and The invention consists in attaching to the stem or mouth-piece, by a screw-thread, or otherwise, an interior tube, which is surrounded by a perforated cup, and covered by a conical cap, as hereinafter described.

Similar letters of reference indicate corresponding parts.

Figure 1:
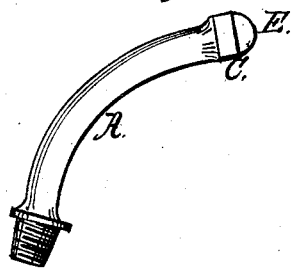
Figure 1 represents the mouth-piece of a smoking-pipe, provided with the improved device.
Figure 2:
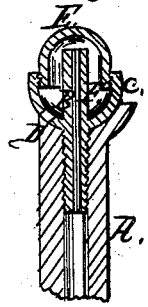
Figure 2 is a longitudinal section of the same, (enlarged,) showing the construction and arrangement of parts.

A is the mouth-piece tube.

B is the interior tube, screwed into the tube A, as seen in the drawing.

C is the cup, through which the tube B passes, and to which it is firmly attached.

D is an orifice through the cup C, for the discharge of the smoke into the mouth, in the act of smoking.

E is the cap or tip, of globular form, screwed into the cup, as seen.

The cup C and the tip E form a globular chamber, F, into which the interior tube B extends.

This tip E prevents the current of smoke inhaled from striking or coming in contact with the tongue of the smoker, thus preventing that pungent or stinging sensation so often experienced.

Saliva, or fluids in the mouth, cannot enter the interior tube or the stem A, owing to the arrangement of the tube in the chamber F.

This attachment forms a handsome and ornamental finish to the mouth-piece. It may be made of silver, in whole or in part, or of any other suitable material.

By the use of it, the pipe will remain clean and sweet for a much longer period than without it, as no moisture can enter the tube or stem, to gum up the stem and obstruct the passage of the smoke.

Having thus described our invention,

We claim as new, and desire to secure by Letters Patent—

The interior tube B, the perforated cup C, and the cap or tip E, in combination with the mouth-piece of a smoking-pipe, arranged substantially as shown and described.

J. P. COURTNEY.
WM. H. KELAGHER.

Witnesses:
WM. F. MCNAMARA
ALEX. F. ROBERTS.